Oct. 8, 1929.     W. C. BLACK     1,730,755
COAL CUTTING MACHINE AND THE LIKE
Filed May 19, 1928     3 Sheets-Sheet 1

INVENTOR
WILLIAM CHRISTIE BLACK
by
Attorney.

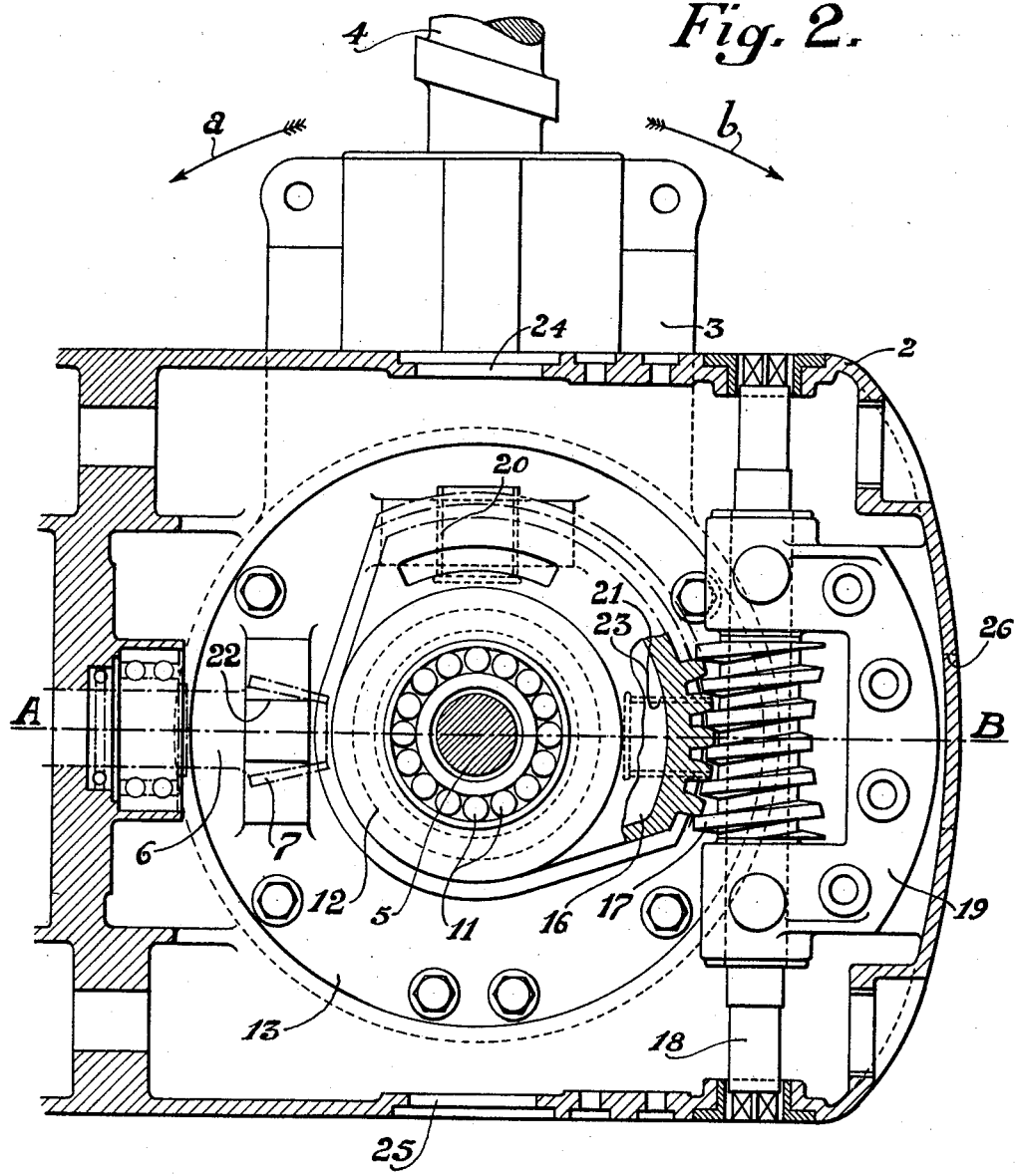

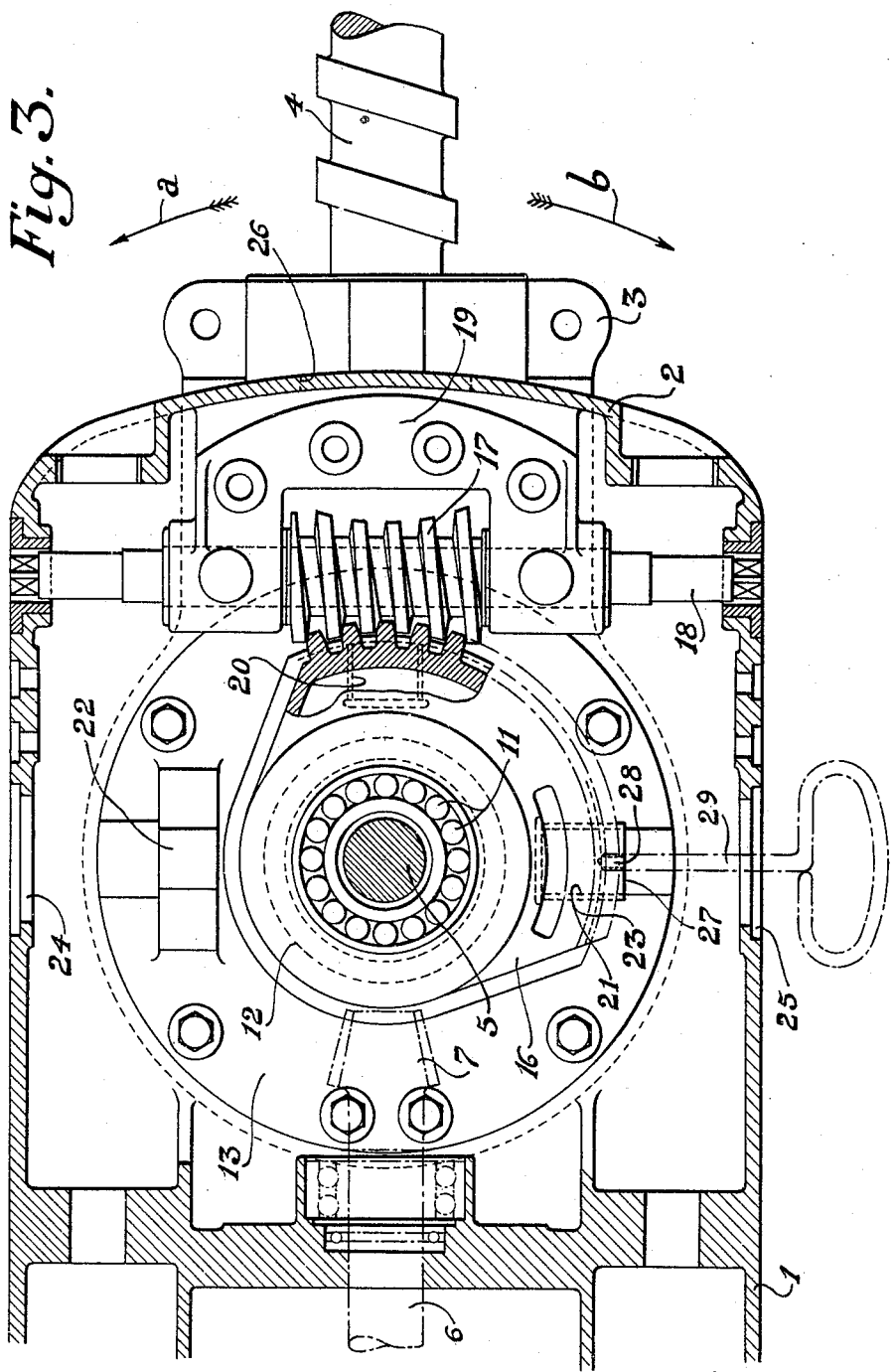

Patented Oct. 8, 1929

1,730,755

UNITED STATES PATENT OFFICE

WILLIAM CHRISTIE BLACK, OF DUDLEY, ENGLAND, ASSIGNOR TO MATTHEW SMITH MOORE, OF BRUSSELS, BELGIUM

COAL-CUTTING MACHINE AND THE LIKE

Application filed May 19, 1928, Serial No. 279,119, and in Belgium June 3, 1927.

This invention relates to coal cutting and like machines and more particularly to the means for sluing or bodily swinging the casing or frame carrying the cutting members, whether of the bar or chain type. It has for its objects to improve the internal structure of the gear head and in particular to provide means whereby a worm gearing can be incorporated within the gear head of a coal cutting machine of limited vertical dimensions.

The application of power driven means for sluing the cutting mechanism is well known and a worm gear has been employed for this purpose, but such gear can only be located inside the gear head when the height of the gear head casing is sufficient to allow of the worm or worm-wheel passing underneath the horizontal driving shaft rotated from the motor. In machines where such height is not available the worm must be external and is therefore subject to corrosion in damp places or to jamming due to coal dust and grit getting into the gears. It further is liable to damage in actual operation.

Now according to the present invention I am enabled to locate the worm gearing within a gear head casing of small height and I avoid the above mentioned inconveniences by substituting for the usual wormwheel a toothed sector pivoted on the vertical shaft of the gear head and adapted to be detachably connected, in at least two different relative positions, to the case or frame carrying the cutting members. The toothed sector extending on one side only of the vertical shaft, said sector and the worm may be arranged at the same level as the horizontal driving shaft without interfering therewith.

For convenience the detachable connection with the case or frame of the cutting mechanism is preferably provided between the toothed sector and an intermediate member in the shape of a flat-based tubular support for the vertical shaft of the gear head, which support is so arranged that a cutter bar banjo or a chain jib head may be secured thereto at will, as described and claimed in my co-pending application Ser. No. 274,437 filed May 2, 1928.

When the toothed sector is connected to this support in one relative position it can carry the same with the cutting members through an angle of say 90° without interference from the horizontal driving shaft. If it is desired to swing the cutting members through a larger angle, the connection between the sector and support is released, the sector alone is swung back, its connection with the support is restored in a different relative position and the support then can be carried through a further angle of 90° making altogether 180°. This sequence of operations may be repeated, or the direction of rotation may be reversed, so that the cutting mechanism can be swung in either direction through any desired angle as if a complete wormwheel was provided.

In the accompanying drawing illustrating by way of example an embodiment of my invention applied to a coal cutting machine of the bar type, Fig. 1 is a vertical axial section of the gear head taken on line A—B of Fig. 2.

Figs. 2 and 3 are horizontal sections on line C—D of Fig. 1, showing two different positions of the sluing sector and bar mechanism.

Figure 4:
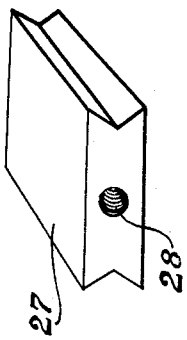
Fig. 4 is a perspective view of a key forming part of the detachable connection.
Figure 1:
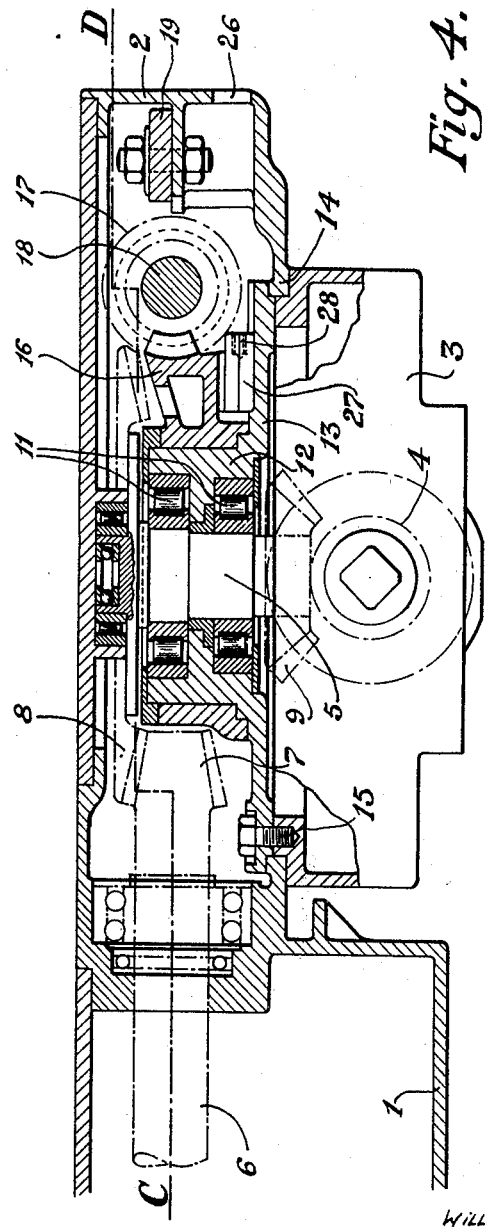

In the drawing 1 is the frame of the machine, 2 the gear head casing secured thereto and 3 the rotatable banjo or casing in which is mounted the cutter bar 4. The vertical shaft 5 of the gear head is rotated from the motor by the horizontal driving shaft 6, pinion 7 and toothed wheel 8, and in turn it rotates the bar 4 by means of the pinion 9 and gear 10.

The shaft 5 is supported in roller bearings 11 mounted in a tubular support 12 provided with a flat base 13 resting on an annular seat 14 surrounding the bottom opening of the casing 2. To the base 13 is secured, by means of screws 15 or otherwise, the banjo 5 which may be replaced by the head portion of a chain jib when it is desired to change the machine from the bar type to the chain type as disclosed in my aforesaid patent application Ser. No. 274,437 filed May 2, 1928.

Pivotally mounted on the support 12 is a toothed sector 16 meshing with a worm 17 on a transverse shaft 18 mounted in a yoke-shaped support 19 on the side of the vertical shaft 5 remote from the driving shaft. The worm 17 is held against endwise motion by its support 19 and it may be rotated by hand or by mechanical means (not shown).

The sector 16 is provided on its underside with two radial keyways 20, 21 at an angle of say 90° to each other and adapted to register each in turn with either of two diametrically opposite keyways 22, 23 in the top side of the base 13.

Openings 24, 25, 26 are provided in the side walls and end walls of the casing 2, through which a key 27 may be introduced into the registering keyways in the support 12 and sector 16, thus locking the two parts together and forming a suitable driving connection between the worm 17 and banjo 3.

The keyways in the support and sector are preferably dove-tailed, the key 27 being shaped accordingly (Fig. 4) and provided at one end with an internally threaded hole 28 adapted to be engaged by the screw threaded end of a handle 29 (Fig. 3) to permit of ready insertion and removal of the key.

The parts being in the position shown in Fig. 3 with the keyways 21 and 23 coinciding, if it is desired to swing the cutting mechanism in the direction of the arrow $a$ the key 27 is introduced through the opening 25 into the registering keyways 21, 23 and the worm is rotated to carry the sector 16 through the desired angle. If this angle exceeds 90°, the rotation is stopped after 90°, the parts then being in the position illustrated in Fig. 2, the key is removed through the opening 26, and the sector alone is sung back in the direction of the arow $b$ until the keyway 20 is brought into register with the keyway 23 in the plate 13. The connection between the sector 16 and support 12 then is restored by inserting the key 27 in the coinciding keyways 20, 23, and the rotation of the sector with the cutting mechanism can be resumed in the direction of arrow $a$.

If the cutting mechanism has to be swung from the position of Fig. 3 in the direction of arrow $b$, the sector 16 first is rotated alone to bring the keyway 20 into register with the keyway 22 in the support, then the key 27 is inserted in these keyways through the opening 24 and the operation described above is repeated in the reverse direction.

It is seen that owing to the possibility of rotating the sector alone to bring either of its keyways into register with each of those in the rotatable support 12, sluing through any desired angle can easily be performed in either direction, without any parts being required to pass under the shaft 6 in order to clear the same. The structure shown is extremely compact and particularly suitable for machines of limited vertical dimensions. It will also be observed that in any position it has been carried to by the sluing means the cutting mechanism is rigidly held by the locking engagement of the sector 16 with the worm 17 which is firmly secured against endwise movement.

While the invention has been described in connection with a machine comprising an external tubular support for the vertical shaft of the gear head, it will be understood that it is not limited to this particular type of machine and that I may vary the construction illustrated without departing from the spirit of my invention.

I claim:

1. In a machine for coal cutting and the like, the combination, with a cutting mechanism, of a gear head having a vertical shaft, a gear head casing, a worm gear in said casing for sluing said cutting mechanism, said worm gear comprising a worm and a toothed sector both housed in said casing, and means for detachably securing said sector to said cutting mechanism in at least two different relative positions.

2. In a machine for coal cutting and the like, the combination of a gear head having a vertical shaft, a horizontal driving shaft on one side of said vertical shaft, a worm on the side of said vertical shaft remote from said driving shaft, a toothed sector meshing with said worm, a rotatable member, both said sector and member being co-axial with said vertical shaft, means for detachably securing said sector to said member in at least two different relative positions and a gear head casing enclosing all said parts.

3. In a machine for coal cutting and the like, the combination of a gear head having a vertical shaft, a gear head casing having an annular seat surrounding a bottom opening, a rotatable support for said shaft engaging said annular seat, a worm in said casing, a toothed sector meshing with said worm, said sector and support being co-axial with said shaft, and means for detachably connecting said sector with said support in at least two different relative positions.

4. In a machine for coal cutting and the like, the combination, with a cutting mechanism, of a gear head having a vertical shaft, a gear head casing having a bottom opening, a rotatable support for said shaft seated on the edge of said opening, a worm in said casing, a toothed sector meshing with said worm, said sector and support being co-axial with said shaft, means for detachably connecting said sector with said support in at least two different relative positions, and means for securing said cutting mechanism to said support.

5. In a machine for coal cutting and the like, the combination of a gear head comprising a vertical shaft, a horizontal worm, a tubular member surrounding said shaft, a toothed sector surrounding said tubular member and meshing with said worm, keyways in said member and registering keyways in said sector, the keyways in said member being in a different angular relation to each other from the keyways in said sector, a key for locking any of the keyways in said member with any of the keyways in said sector, and a gear head casing enclosing all the above-mentioned parts.

6. In a machine for coal cutting and the like, the combination of a gear head comprising a vertical shaft, a gear head casing having a bottom opening, a horizontal worm in said casing, a rotatable support having a tubular portion surrounding said shaft and a flat base seated on the edge of said opening, a toothed sector coaxial with said shaft and meshing with said worm, diametrically opposite keyways in the base of said support, keyways in said sector adapted to register therewith, the keyways in said sector being at 90° to each other, and a key adapted to be inserted in any two registering keyways.

7. In a machine for coal cutting and the like, the combination, with a coal cutting mechanism, of a gear head, a gearhead casing, a worm and a co-operating pivoted toothed sector in said casing, and means for rigidly connecting said sector with said cutting mechanism in different angular positions.

8. In a machine for coal cutting and the like, the combination, with a coal cutting mechanism, of a vertical shaft, a horizontal driving shaft and a horizontal worm on opposite sides of said vertical shaft, a toothed sector meshing with said worm, said sector being coaxial with and rotatable on said shaft, said worm and sector being substantially at the same level as said driving shaft, cooperating gears on said driving and vertical shafts, means for connecting said sector with said coal cutting mechanism in different angular positions, and a flat casing enclosing all said parts with the exception of said coal-cutting mechanism.

WILLIAM CHRISTIE BLACK.